(12) United States Patent
Ramesh et al.

(10) Patent No.: US 8,005,836 B2
(45) Date of Patent: Aug. 23, 2011

(54) METHOD AND SYSTEM FOR PERFORMING LOGICAL PARTIAL DECLUSTERING

(75) Inventors: Bhashyam Ramesh, Secunderabad (IN); Michael Watzke, Madison, WI (US)

(73) Assignee: Teradata US, Inc., Dayton, OH (US)

( * ) Notice: Subject to any disclaimer, the term of this patent is extended or adjusted under 35 U.S.C. 154(b) by 447 days.

(21) Appl. No.: 11/622,595

(22) Filed: Jan. 12, 2007

(65) Prior Publication Data
US 2007/0174278 A1 Jul. 26, 2007

(51) Int. Cl.
*G06F 17/30* (2006.01)
(52) U.S. Cl. . 707/736; 707/737; 707/696; 707/999.002; 707/999.003; 707/999.006; 716/104
(58) Field of Classification Search .................. 707/2, 3, 707/4, 5, 6, 999.002–999.006, 736
See application file for complete search history.

(56) References Cited

U.S. PATENT DOCUMENTS 5,970,495 A * 10/1999 Baru et al. ................... 707/102
6,182,121 B1 * 1/2001 Wlaschin ..................... 709/215

OTHER PUBLICATIONS

Non-Patent publication "Analysis of Dynamic Load Balancing Strategies for Parallel Shared Noting Database Systems" for Proceedings of the 19th VLDB Conference, Dublin, Ireland, 1993, pp. 182-193, and written by Erhard Rahm and Robert Marek.*

* cited by examiner

*Primary Examiner* — Apu M Mofiz
*Assistant Examiner* — Monica M Pyo

(57) ABSTRACT

A method and system for performing logical partial declustering in a shared-nothing database environment. The solution defines a partial declustering technique that can be used to dynamically adapt the declustering of base tables or intermediate result sets. The partial declustering technique is defined to limit the number of partitions (P) involved in an operation. The technique is defined to limit the operation to a subset of the system partitioning map (SPM). There are two components: the association between the data values and partitions is altered by restricting the data values to P' partition values where P' is less than P; and the actual partitions of the SPM selected are then derived based on a seed derived from a dynamic parameter, such as a session number, or a static parameter, such as a table identifier. In the case of intermediate result sets the number of P' partitions selected is a cost based decision based on the estimated number of rows in the input intermediate result sets. In the case of a base table the number of P' partitions is selected based on the table DDL. There is no physical partitioning definitions, rather logical partitions are defined based on subsetting the SPM.

20 Claims, 3 Drawing Sheets

METHOD AND SYSTEM FOR PERFORMING LOGICAL PARTIAL DECLUSTERING

BACKGROUND

Computer systems generally include one or more processors interfaced to a temporary data-storage device such as a memory device and one or more persistent data-storage devices such as disk drives. Each disk drive generally has an associated disk controller. Data is transferred between the disk drives and the disk controllers. Data is also transferred between the disk controller(s) and the memory device over a communications bus or similar.

Data organization in a computer system such as that above is important in relational database systems that deal with complex queries against large volumes of data. Relational database systems allow data to be stored in tables that are organized as both a set of columns and a set of rows. Standard commands are used to define the columns and rows of tables and data is subsequently entered in accordance with the defined structure.

The defined table structure is locally maintained but may not correspond to the physical organization of the data. In a parallel shared nothing relational database data can be stored across multiple data-storage facilities, each data-storage facility in turn including one or more disk drives. Data partitioning can be performed in order to enhance parallel processing across multiple data-storage facilities. The intent behind data partitioning is to evenly distribute the data among all computational elements such that performance scales linearly as more computational elements are added. The database could be hash partitioned, range partitioned, round-robin partitioned or not partitioned at all.

Hash partitioning is a partitioning scheme in which a predefined hash function and map is used to assign rows in a table to respective processing modules and data-storage facilities. The hashing function generates a hash or partition bucket number and the partition numbers are mapped to data-storage facilities. Range partitioning is a partitioning scheme in which each data-storage facility manages the records falling within a range of values. Round Robin partitioned is a partitioning scheme where the data-storage facility is picked in a round robin fashion. No partitioning means that a single data-storage facility manages all of the rows.

One drawback of current systems is that the mapping of partitions to the data-storage facilities on which the rows are stored is often required to be physically defined in advance especially when the mapping is not to all the data-storage facilities but to a subset of them. The mapping of partitions to data-storage facilities is therefore static. A static mapping to specific user defined data-storage facilities often leads to uneven distribution of rows over the data-storage facilities. This in turn has the potential to increase the execution time for complex queries.

Users of relational database systems require the minimum time possible for execution of complex queries against large amounts of data. In a parallel shared nothing relational database system it is often important to evenly allocate both table rows and free space across multiple data-storage facilities.

SUMMARY

Described below are techniques for performing logical partial declustering. When data is partitioned evenly across all the partitions in the system it is called full declustering. When data is partitioned to only some of the partitions, and not to all the partitions, it is called partial declustering. When the partition selection is not specified using physical entities (or addresses) such as physical partitions or when the mapping of data items to partitions (i.e. partition selection) is not static it is called logical partial declustering.

The techniques for logical partial declustering are suited to organizing data values such as rows of a table in which a plurality of the data values are each associated with one of a plurality of partitions. None of the data values are associated with more than one partition.

The partition associated with at least one of the data values is identified, the partition selected from a group of P distinct partitions. A new partition is selected from a group of P' distinct partitions, where P'<P. The new partition is then substituted for the identified partition.

The partitions in the group of P' distinct partitions are influenced by a static parameter or by a dynamic parameter.

The plurality of data values in one technique are each associated with the plurality of partitions by a partitioning component identifying relationships between data values and partitions. The new partition is substituted for the identified partition by amending one or more of the relationships between data values and partitions within the partitioning component.

DETAILED DESCRIPTION

Figure 1:
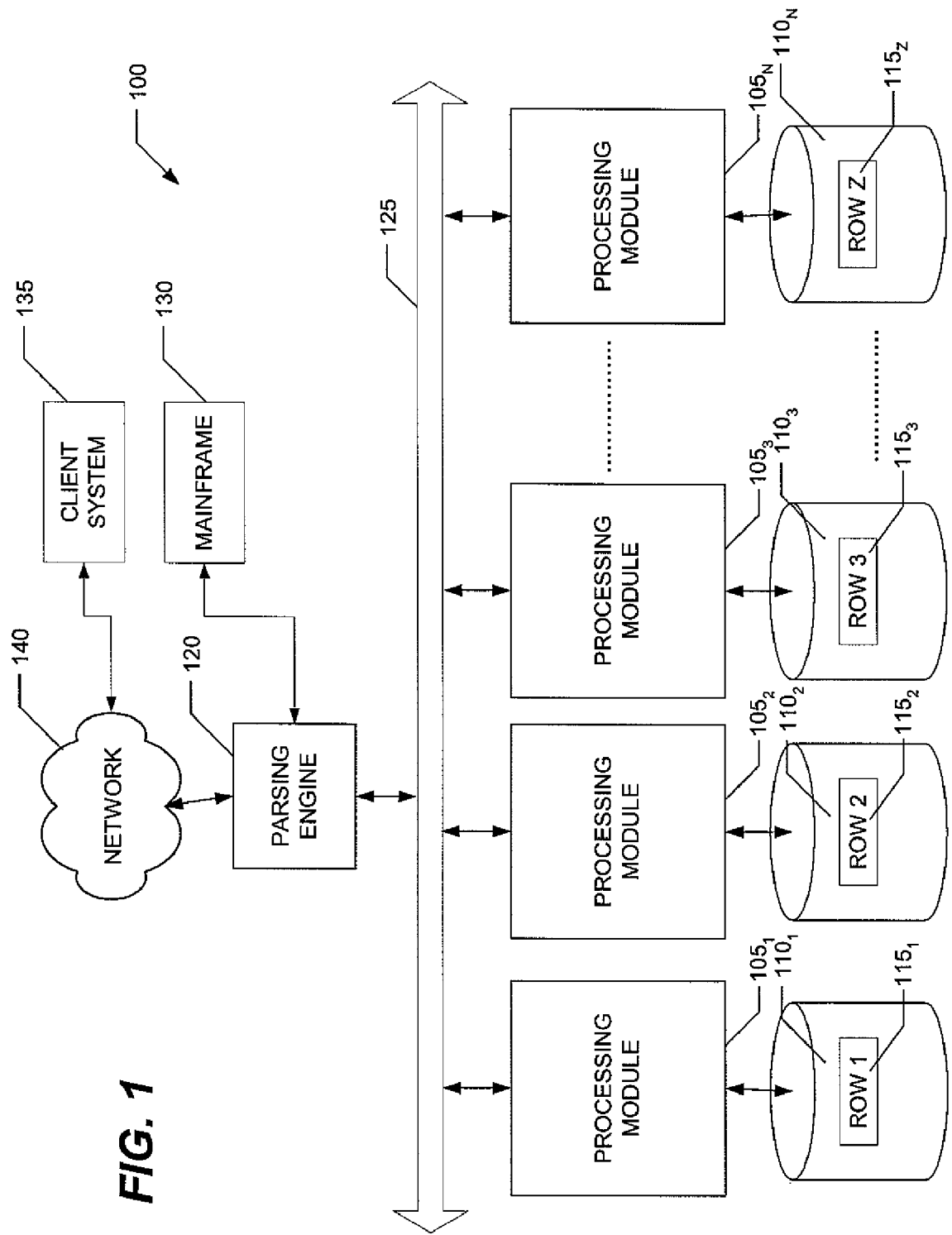
FIG. 1 is a block diagram of an exemplary large computer system in which the techniques described below are implemented.

FIG. 1 shows an example of a database system 100, such as a Teradata Active Data Warehousing System available from NCR Corporation. Database system 100 is an example of one type of computer system in which the techniques of managing query optimization are implemented. In computer system 100, vast amounts of data are stored on many disk-storage facilities that are managed by many processing units. In this example, the data warehouse 100 includes a relational database management system (RDMS) built upon a massively parallel processing (MPP) platform.

Other types of database systems, such as object-relational database management systems (ORDMS) or those built on symmetric multi-processing (SMP) platforms are also suited for use here.

The data warehouse 100 includes one or more processing modules $105_{1 \ldots N}$ that manage the storage and retrieval of data in data-storage facilities $110_{1 \ldots N}$. Each of the processing modules $105_{1 \ldots N}$ manages a portion of a database that is stored in a corresponding one of the data-storage facilities $110_{1 \ldots N}$. Each of the data-storage facilities $110_{1 \ldots N}$ includes one or more disk drives.

The system stores data in one or more tables in the data-storage facilities $110_{1 \ldots N}$. The rows $115_{1 \ldots z}$ of the tables are stored across multiple data-storage facilities $110_{1 \ldots N}$ to ensure that the system workload is distributed evenly across the processing modules $105_{1 \ldots N}$. A parsing engine 120 organizes the storage of data and the distribution of table rows $115_{1 \ldots z}$ among the processing modules $105_{1 \ldots N}$. The parsing engine 120 also coordinates the retrieval of data from the data-storage facilities $110_{1 \ldots N}$ over network 125 in response to queries received from a user at a mainframe 130 or a client computer 135 connected to a network 140. The database system 100 usually receives queries and commands to build tables in a standard format, such as SQL.

In one implementation, the rows $115_{1 \ldots Z}$ are distributed across the data-storage facilities $110_{1 \ldots N}$ by the parsing engine 120 in accordance with their primary index. The primary index defines the columns of the rows that are used for calculating a hash value or partition value, referred to below as a partition. The function that produces the partition value from the values in the columns specified by a partition attribute (called a primary index in Teradata terminology) is called a hash function or partition function. The partitions are mapped to processing modules $105_{1 \ldots N}$ and associated data-storage facilities $110_{1 \ldots N}$ by a partitioning map (not shown). The processing modules $105_{1 \ldots N}$ manage the disk drive(s) forming each of the data-storage facilities $110_{1 \ldots N}$ by striping data across the disk drives. A row is accessed by determining its partition. Information about the partition number is then used to determine the correct processing module, disk storage facility and disk drive. The characteristics of the columns chosen for the primary index determine how evenly the rows are distributed.

Figure 2:
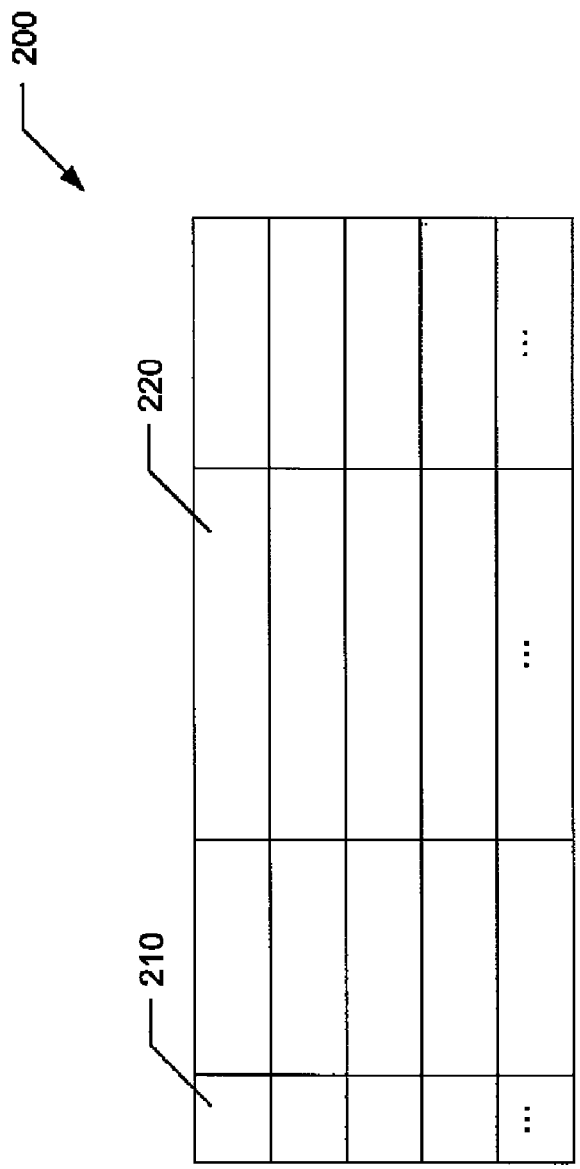
FIG. 2 is a floor diagram of a table distribution process.
Figure 2:
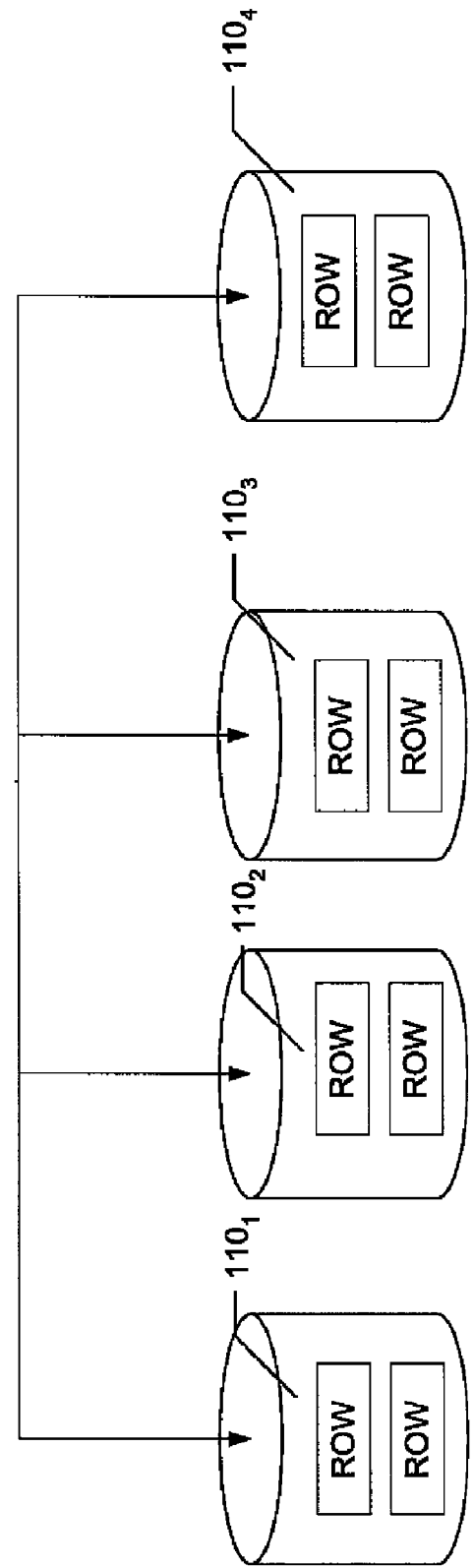

FIG. 2 shows an example of rows of a table to be distributed within database system 100. The table 200 contains a plurality of rows and the rows are stored in a plurality of data-storage facilities $110_{1 \ldots 4}$ by the parsing engine 120. In one example two of the columns indicated at 210 and 220 respectively are designated as the primary index when the table is created. The partition function is then applied to the contents of columns 210 and 220 for each row. The resulting partition value is mapped to one of the processing modules $105_{1 \ldots N}$ and data-storage facilities $110_{1 \ldots 4}$ and the row is stored in that facility. For simplification and for the purposes of explanation it is assumed that there is a one to one relationship between partitions and data-storage facilities namely that each data-storage facility represents one partition. In practice this will not always be the case as some of the data-storage facilities will not be mapped to a partition and furthermore one or more of the data-storage facilities could be mapped to more than one partition. Four examples are described below. Other examples include schemes such as round robin, specific value ranges to specific partitions, and general hashing techniques.

In one example mapping function the primary index indicates a column containing a sequential row number. In this example the partition function is the sum of the remainder, where the row number is divided by four, and the value one. With this partition function, the first eight rows shown in FIG. 2 will be distributed evenly among the data-storage facilities. For example row 1 will be stored on data-storage facility $110_1$, row 2 will be stored on data-storage facility $110_2$ and so on.

Another example mapping function is a non-hashed function where the primary index indicates a column containing a text string for example a surname. The function specifies that rows in which the text string begins with the letters A to G are stored on data-storage facility $110_1$, text string values starting with the letters H to M are stored on data-storage facility $110_2$, text string values starting with the letter N to S are stored on data-storage facility $110_3$ and text string values starting with the letters T to Z are stored on data-storage facility $110_4$.

In another example the primary index indicates a column containing a numeric value between 0 and 100. The function could specify one of four partitions based on integer values of 0 to 25, 26 to 50, 51 to 75 and 76 to 100 respectively.

In a further example, the function assigns individual rows of the table randomly to individual partitions. In some cases this will avoid the uneven distribution of data in which the partitioning criteria are pre-specified and the table definition does not anticipate the particular data values to be stored in that table. For example, if after having set up a partitioning function that allocates data string values starting with A to G in one partition, if it is later found that the majority of rows in the table contain strings that start with the letters A to G, this would result in an uneven distribution of the rows over the partitions.

In all of the cases above, the default table set up is that as data is entered into a base table, individual data rows are distributed among all available partitions. In the above examples this means that the rows will be distributed among all available data-storage facilities.

Figure 3:
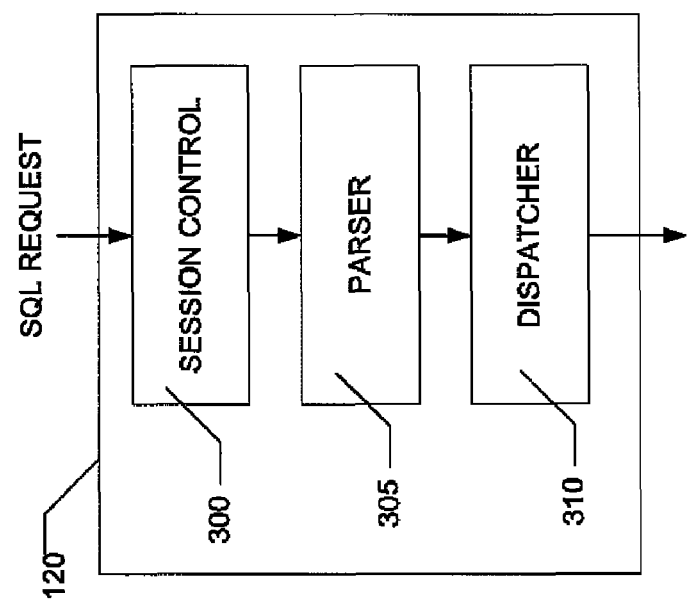
FIG. 3 is a block diagram of the parsing engine of the computer system of FIG. 1.

In one example system shown in FIG. 3, the parsing engine 120 is made up of three components: a session control 300, a parser 305, and a dispatcher 310. The session control 300 provides a log on and log off function. It accepts a request for authorization to access the database, verifies it, and then either allows or disallows the access. Once the session control 300 allows a session to begin, a user may submit a SQL request, which is routed to the parser 305.

Figure 4:
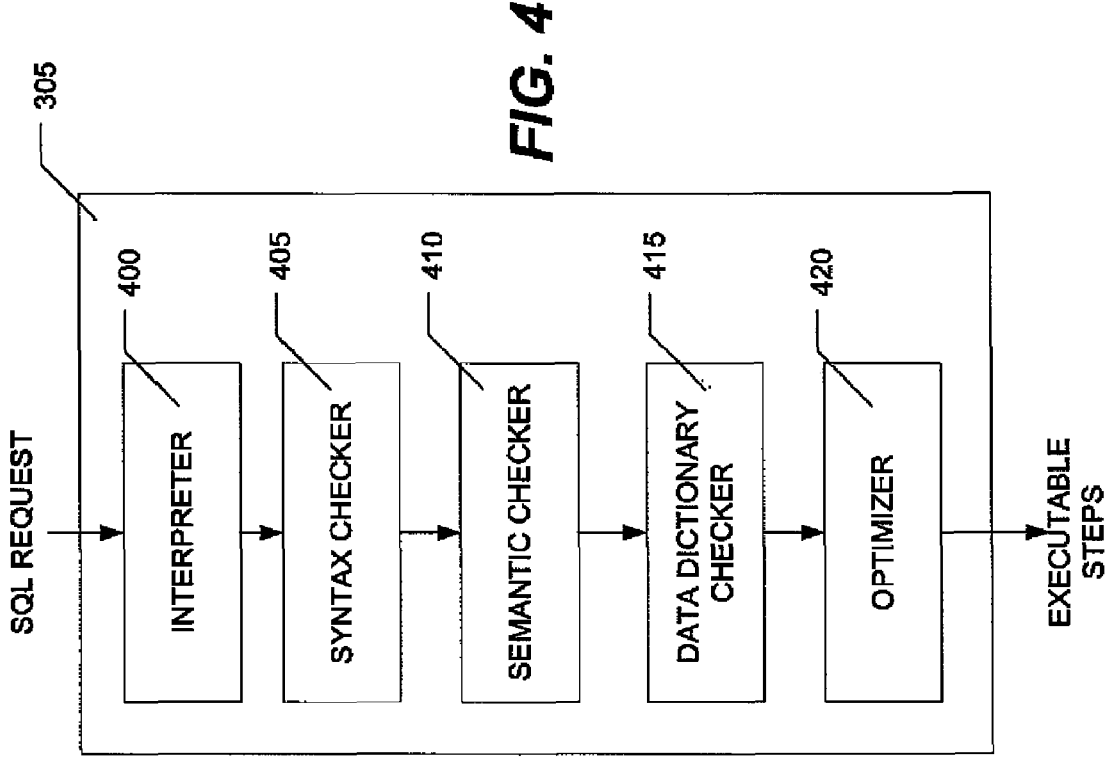
FIG. 4 is a flow chart of the parser of FIG. 3.

As illustrated in FIG. 4, the parser 305 interprets the SQL request (block 400), checks it for proper SQL syntax (block 405), evaluates it semantically (block 410), and consults a data dictionary to ensure that all of the objects specified in the SQL request actually exist and the user has the authority to perform the request (block 415). Finally, the parser 305 runs an optimizer (block 420) which develops the least expensive plan to perform the request.

The partitioning map provides a mechanism to separate and locate particular data segments representing rows in a table. In one embodiment the partitioning map defines multiple partitions. Each partition is associated with one or more data-storage facilities. When system 100 needs to locate a particular data row, the system first determines the correct partition. The partition number is then used to determine the correct processing module, disk-storage facility and disk drive. As described above, mapping of a partition number to data-storage facilities is static.

A benefit of distributing data segments representing rows of a table across multiple partitions, and/or data-storage facilities is that queries involving the values of columns in the primary index can be efficiently executed because the processing module 105 having access to the data-storage facility 110 that contains the row can be immediately determined. For example, if values from a particular row are desired, the parsing engine 120 can apply the partitioning function to determine that only one processing module associated with the data-storage facility on which the row is stored need to be used.

Most database operations have an associated cost. In order to retrieve data to satisfy a user query, all processing modules 105 associated with all data-storage facilities 110 that have stored or are likely to have stored rows of data required to satisfy the user query must be accessed. There is an overhead cost in initiating a processing module 105 and in retrieving a row or rows from its associated data-storage facility. Where a particular data-storage facility 110 only contains one row of interest to the query, the overhead cost is almost as high as the cost of retrieving multiple rows from the same data-storage facility. Described below are techniques for addressing this overhead.

In one technique the table definition for a particular table specifies that the table must use a specified number of partitions, where the specified number is less than the total number of partitions available. It is beneficial where small tables are in few partitions for database operations such as access, joins and aggregations. The partition selection is based on:

a) a user specified number (in the case of a table) or a cost based determination (in the case of an intermediate result set) of the number of partitions; and b) a compensation factor to prevent skewing. The compensation factor could be a static parameter (for example a table identifier) or a dynamic parameter (for example a session identifier).

In a typical case a user will define a new table as follows:

CREATE TABLE t1 AS (c1 INTEGER, c2 INTEGER)

In the above example, if there are ten partitions available in which to store rows of table t1, these rows will be distributed among all ten partitions based on a static system partitioning map (SPM). The particular distribution function could evenly distribute the rows among the ten partitions, could distribute the rows based on certain column values or could assign rows randomly as described above. In each case all ten partitions are available.

As an alternative, the user specifies a logical partial declustering of the table when defining the table as follows:

CREATE TABLE t1 AS (c1 INTEGER, c2 INTEGER

PARTITION INDEX (c1) DECLUSTER ON 5 PARTITIONS

This table definition specifies that of the ten possible partitions in which rows of table t1 can be placed; only five of those partitions are to be used. The definition is logical in that the user does not need to physically define or redefine any partitions or data-storage facilities. The user does not need to specify which partitions are to be used, as this is ideally performed as a system function. Typical system functions are described below. The user simply specifies that not all of the partitions are to be used and further specifies the number of partitions to be used.

Whenever a subset of the processing modules are to be used the challenge is to ensure that some processing modules do not get hot due to over usage. This is hard to do when a user specifies the processing modules and data-storage facilities on which the table should be stored. By using a session independent parameter such as a table ID the processing modules on which a table is stored are randomly selected and therefore avoid hot processing modules or skew.

Another example is as follows:

CREATE TABLE t2 AS (c3 INTEGER, c4 INTEGER)

PARTITION INDEX (c3) DECLUSTER ON 1 PARTITION

This table definition ensures that all rows of table t2 are stored in the same partition. Out of the ten available partitions on which to store rows of table t2, only one of these will be used. This user definition would be suitable for tables in which the user knows in advance that the table is likely to have very few rows and it is therefore sensible to store all of those rows in one partition.

Where there are P partitions in a database system, and where the user has specified in the base table definition that only P' partitions are to be used, where P' is less than P, then there are several system function techniques for selecting the actual partitions in which to store rows of the table.

In one technique a seed is derived from a static parameter such as a table identifier. Using the table identifier value as a seed, the rows are stored in a subset P' of the partitions P. The group of P' distinct partitions are therefore influenced by a static parameter. In the example above, the rows for table t1 will be stored on five different partitions. For example if the table identifier is TID and a function on the partitioning columns c1 produces a set of values P, then the actual partitions P' can be calculated using the MOD operator to restrict the partitions as follows:

$$P'=(P \text{ MOD } 5)+\text{starting-partition}$$

The starting-partition itself is a function of the table identifier TID. As an example a typical equation for calculating starting-partition could be as follows:

$$\text{Starting-partition}=\text{hashfunction(TID)}$$

The hashfunction(TID) determines the starting partition. The rows will be stored in 5 partitions starting from P' to P'+5 partitions.

Set out below are cases in which logical declustering based on a static parameter would be advantageous. In these cases the partitions in the group of P' distinct partitions are influenced by a static parameter. In the following examples the term "LT" represents a large table with many rows and the term "ST" represents a small table with few rows. Each table has a first column c1 which is the partitioning attribute for the table, and additional columns c2, c3 and c4.

One example is the following user query:

SELECT*FROM ST;

SELECT*FROM ST WHERE c1<5;

SELECT*FROM ST WHERE c2=3;

SELECT SUM (c2) FROM ST;

In this example ST is a small table stored on few partitions. Performing the operation on few partitions results in fewer overall read and write I/O operations. Additionally it enables subsequent operations to be localized.

Another query that benefits from static declustering is as follows:

SELECT*FROM ST, LT

WHERE LT.c1=5

AND ST.c1=LT.c2

In this case a join is performed on fewer partitions and a write of output is performed on fewer partitions also. This is because the rows selected from the large table LT are sent to the partition(s) in which the small table ST exists instead of to all partitions which would have been the case had the small table ST been partitioned to all processing modules when it was created.

A further user query is as follows:

SELECT*from ST, LT

WHERE ST.c1=LT.c2

This is an example of a small table ST and large table LT join involving a primary key and a foreign key. It is assumed here that c1 is the primary key and c2 is the foreign key corresponding to the primary key. The benefit is fewer I/O operations to read the small table.

In other techniques the partitioning of the intermediate result sets is also onto fewer partitions. The selection of the partitions is not based upon either of the input sets but on a dynamic partitioning definition that is based upon costing, where "costing" is the cost of processing the rows. In these cases the partitions in the group of P' distinct partitions are influenced by a dynamic parameter. As described above, the example system includes a parsing engine 120 that in turn includes a session control 300 that provides a logon and logoff function. The session control 300 accepts a request for authorization to access the database, verifies it, and then either allows or disallows the access. The session control 300 in one embodiment creates a session number that is in existence during a user session. This session number is one example of a dynamic parameter that can be used as a seed. In other techniques the dynamic parameter includes a user name, a host machine identifier, or any other dynamic parameter that is only available within a user session. The dynamic parameter is essentially an attribute of the session or the user request. The partitions in the group of P' distinct partitions are therefore influenced by a dynamic parameter.

Set out below are cases in which a logical declustering technique based on a dynamic parameter is advantageous.

Consider the following user query:

SELECT*FROM LT1, LT2

WHERE LT1.c2=LT2.c2

AND LT1.c1=1

AND LT2.c1=2

In the above example both tables LT1 and LT2 are large tables. If rows selected from both tables LT1 and LT2 are partitioned dynamically to a few partitions then the join will be performed on few partitions and the output written on few partitions also.

Another example where a dynamic parameter is advantageous is in the following user query:

SELECT*FROM LT1, LT2

WHERE LT1.c1=LT2.c2

AND LT1.c2=1

AND LT2.c2=2

In this case, again moving selected data to only a few partitions and performing a join is more cost effective than performing a local join on all P partitions.

Another example of where a dynamic parameter would be advantageous is in the following user query:

SELECT*FROM sales, week, item, store

WHERE week.month='December'

AND item.class='scarf'

AND store.dstr='northeast'

AND . . .

Where there are only four weeks in the month of December, twenty items and ten stores, the benefit of a dynamic parameter will be that dimensions are built on few partitions and then redistributed to a fact table.

The use of logical partial declustering is applicable to both base tables and intermediate result sets. Whereas a base table will have the number of partitions P' defined by the user in advance, in the case of intermediate result sets the number of P' partitions selected is a cost based decision based on the estimated cost of processing the intermediate result sets. In the case of a base table a user knows in advance whether a particular table is likely to have a significant number of rows. In the case of an intermediate result set the system estimates the cost of processing the rows which includes among other things the likely number of rows. If there are few rows likely a smaller number of P' partitions will be selected by the system.

The above techniques have the potential to improve workload scalability by reducing the number of partitions involved in a database operation. This in turn has the potential to improve query response time, path length and response time consistency. Performing operations on a small number of rows on a small number of partitions benefits by less set up overhead associated with individual processing modules and fewer read and write I/O operations.

A characteristic of the above techniques is that there is no user involvement in the actual selection of P' partitions used for a particular base table or intermediate result set. The particular P' partitions used for such data are based on a logical definition and not a physical partition assignment common to existing databases.

The techniques described above have the potential to reduce the number of input/output operations by a factor of the number of partitions required to process a query operation between two small intermediate results. Example operations that significantly benefit from the above techniques include join and aggregate.

A further benefit of the technique is the ability to execute subsequent operations in a localized manner. In one case a join is followed by an aggregate. If the join occurs on one partition the system performs a partition local aggregate rather than a global aggregate. This is demonstrated by the following user query:

SELECT*FROM ST.c3, AVG (LT.c4) FROM ST, LT

WHERE LT.c1=5

AND ST.c1=LT.c2

GROUP BY ST.c3

The text above describes one or more specific embodiments of a broader invention. The invention also is carried out in a variety of alternative embodiments and thus is not limited to those described here. Those other embodiments are also within the scope of the following claims.

We claim:

1. A method for organizing data values in which a plurality of the data values are each associated with one of a plurality of partitions in a database system, the method comprising:
    identifying, by a processing node of the database system, a group of P distinct partitions;
    selecting, by the processing node, a group of P' distinct partitions, wherein (i) P'<P, and (ii) the group of P' distinct partitions is defined logically without having to physically define or redefine any partitions; and
    substituting, by the processing node, the group of P' distinct partitions for the group of P distinct partitions to (i) allow a user query to be performed on data values associated with the group of P' distinct partitions instead of data values associated with the group of P distinct partitions, and (ii) reduce the number of partitions involved in the user query and thereby to improve system performance.

2. The method of claim 1, wherein the partitions in the group of P' distinct partitions are influenced by a static parameter.

3. The method of claim 2 wherein (i) a plurality of the data values are each associated with one of a plurality of tables in a database identified by a table identifier, and (ii) the static parameter comprises the table identifier or database identifier.

4. The method of claim 1, wherein the partitions in the group of P' distinct partitions are influenced by a dynamic parameter.

5. The method of claim 4, wherein the dynamic parameter comprises an attribute of a session or a user request.

6. The method of claim 1, wherein (i) the plurality of data values are each associated with the plurality of partitions by a partitioning component identifying relationships between data values and partitions, and (ii) substituting includes amending one or more of the relationships between data values and partitions within the partitioning component.

7. The method of claim 6, wherein the data values represent intermediate result sets comprising a plurality of rows associated with a user query.

8. The method of claim 7, wherein the number of P' partitions is selected based on cost of processing the rows.

9. The method of claim 6, wherein the data values are associated with a table in a database.

10. The method of claim 9, wherein the number of P' partitions is selected based on a table identifier of the table.

11. A computer-implemented database system, comprising:
   at least one data-storage facility including data values organized therein and in which a plurality of the data values are each associated with one of a plurality of partitions; and
   a processing node in communication with said at least one data-storage facility, said processing node operable to:
   identify a group of P distinct partitions;
   select a group of P' distinct partitions, wherein (i) P' <P, and (ii) the group of P' distinct partitions is defined logically without having to physically define or redefine any partitions; and
   substitute the new group of P' distinct partitions for the identified group of P distinct partitions to (i) allow a user query to be performed on data values associated with the group of P' distinct partitions instead of data values associated with the group of P distinct partitions, and (ii) reduce the number of partitions involved in the user query and thereby to improve system performance.

12. The system of claim 11, wherein the partitions in the group of P' distinct partitions are influenced by a static parameter.

13. The system of claim 12, wherein (i) a plurality of the data values are each associated with one of a plurality of tables in a database identified by a table identifier, and (ii) the static parameter comprises the table identifier.

14. The system of claim 11, wherein the partitions in the group of P' distinct partitions are influenced by a dynamic parameter.

15. The system of claim 14, wherein the dynamic parameter comprises an attribute of a session or a user request.

16. The system of claim 11, wherein (i) the plurality of data values are each associated with the plurality of partitions by a partitioning component identifying relationships between data values and partitions, and (ii) the system is configured to substitute the group of P' distinct partitions for the group of P distinct partitions by amending one or more of the relationships between data values and partitions within the partitioning component.

17. The system of claim 16, wherein the data values represent intermediate result sets comprising a plurality of rows associated with a user query.

18. The system of claim 17, wherein the number of P' partitions is selected based on cost of processing the rows.

19. The system of claim 16, wherein the data values are associated with a table in a database.

20. The system of claim 19, wherein the number of P' partitions is selected based on a table identifier of the table.

* * * * *